(12) United States Patent
Kimura et al.

(10) Patent No.: US 12,218,823 B2
(45) Date of Patent: Feb. 4, 2025

(54) COMMUNICATION POSSIBILITY/IMPOSSIBILITY INDICATION DEVICE, SYSTEM, METHOD, AND PROGRAM

(71) Applicant: NIPPON TELEGRAPH AND TELEPHONE CORPORATION, Tokyo (JP)

(72) Inventors: Hideaki Kimura, Musashino (JP); Erina Takeshita, Musashino (JP)

(73) Assignee: NIPPON TELEGRAPH AND TELEPHONE CORPORATION, Tokyo (JP)

(*) Notice: Subject to any disclaimer, the term of this patent is extended or adjusted under 35 U.S.C. 154(b) by 353 days.

(21) Appl. No.: 17/430,579

(22) PCT Filed: Feb. 4, 2020

(86) PCT No.: PCT/JP2020/004037
§ 371 (c)(1),
(2) Date: Aug. 12, 2021

(87) PCT Pub. No.: WO2020/166425
PCT Pub. Date: Aug. 20, 2020

(65) Prior Publication Data
US 2022/0141123 A1  May 5, 2022

(30) Foreign Application Priority Data
Feb. 15, 2019  (JP) .................................. 2019-025666

(51) Int. Cl.
*H04L 45/12*  (2022.01)
*H04L 12/66*  (2006.01)
(Continued)

(52) U.S. Cl.
CPC ............ *H04L 45/123* (2013.01); *H04L 12/66* (2013.01); *H04L 43/0882* (2013.01);
(Continued)

(58) Field of Classification Search
CPC ... H04L 45/123; H04L 12/66; H04L 43/0882; H04L 45/22; H04L 45/302; H04L 45/42
See application file for complete search history.

(56) References Cited

U.S. PATENT DOCUMENTS 8,792,337 B2*  7/2014  Higgins ................ H04L 12/437
                                                  370/228
9,787,496 B2*  10/2017  Taniguchi ............... H04L 69/40
(Continued)

FOREIGN PATENT DOCUMENTS

JP  2005130049 A  5/2005
JP  2011518506 A  6/2011

OTHER PUBLICATIONS

Ethernet ring protection switching, Recommendation ITU-T G.8032/Y.1344, Aug. 2015.

*Primary Examiner* — Benjamin H Elliott, IV
*Assistant Examiner* — Yewon Kim
(74) *Attorney, Agent, or Firm* — Harness, Dickey & Pierce, P.L.C.

(57) ABSTRACT

An object is to provide a network device and the like that enable a first network that determines a traffic communication route using the Ethernet ring protocol and a second network that determines a traffic communication route by transmitting/receiving a control frame related to the traffic communication route within the network to be connected in a redundant configuration. When the network device according to the present invention has transitioned to a state in which there is no interface that can communicate with the first network and there is an interface that can communicate with the second network, it transitions to a standby state and
(Continued)

further transmits information indicating that communication is impossible to the second network, and when there is an interface that can communicate with the first network and there is no interface that can communicate with the second network, it transitions to the standby state and further transmits communication route change information to the first network.

4 Claims, 5 Drawing Sheets

(51) Int. Cl.
*H04L 43/0882* (2022.01)
*H04L 45/00* (2022.01)
*H04L 45/302* (2022.01)
*H04L 45/42* (2022.01)

(52) U.S. Cl.
CPC ............ *H04L 45/22* (2013.01); *H04L 45/302* (2013.01); *H04L 45/42* (2013.01)

(56) References Cited

U.S. PATENT DOCUMENTS

| | | | | |
|---|---|---|---|---|
| 2009/0168647 A1* | 7/2009 | Holness | ................ | H04L 12/437 |
| | | | | 370/258 |
| 2009/0257348 A1* | 10/2009 | Stokes | .................... | H04L 45/22 |
| | | | | 370/360 |

\* cited by examiner

COMMUNICATION POSSIBILITY/IMPOSSIBILITY INDICATION DEVICE, SYSTEM, METHOD, AND PROGRAM

CROSS-REFERENCE TO RELATED APPLICATIONS

This application is a 371 U.S. National Phase of International Application No. PCT/JP2020/004037 filed on Feb. 4, 2020, which claims priority to Japanese Application No. 2019-025666 filed on Feb. 15, 2019. The entire disclosures of the above applications are incorporated herein by reference.

TECHNICAL FIELD

The present disclosure relates to a network device, a network system, a network connection method, and a program for connecting L2 networks in a device-redundant configuration.

BACKGROUND ART

Network systems have been widespread that use the technology of Layer 2 in the OSI ("open systems interconnection") reference model, which is represented by Ethernet (R) technology. A ring network using the Ethernet ring protocol (ERP) has been proposed as a method for efficiently accommodating wide area traffic and providing high redundancy performance in the above network systems (Non-Patent Literature 1). L2VPN services based on wide area Ethernet using a ring network have been provided.

On the other hand, a method has been proposed that implements a Layer-2 network by a network device present in a network and another network device present in the same network notifying each other of control frames related to device setting information. For example, EVPN (Ethernet VPN) is attracting attention as a method for implementing an L2VPN service.

CITATION LIST

Non-Patent Literature

Non-Patent Literature 1: Recommendation ITU-T G.8032/Y.1344, "Ethernet Ring Protection Switching (08/2015)"

SUMMARY OF THE INVENTION

Technical Problem

Now, consider a method for connecting a network that determines the route taken by L2VPN traffic using the Ethernet ring protocol (hereinafter referred to as a first network) and a network that determines the route taken by L2VPN traffic by transmitting/receiving a control frame within the network (hereinafter referred to as a second network), and allowing communication of traffic from the first network to the second network as well as allowing communication of traffic from the second network to the first network.

Here, when the first network and the second network are connected via a single network device, the failure of the network device triggers interruption of communication between the first network and the second network. Therefore, it is desirable that there are a plurality of network devices as a network device connecting the first network and the second network.

On the other hand, when they are connected via a plurality of network devices, a loop failure occurs due to the characteristics of the L2 network. That is, as shown in FIG. 1, an operation continues such that traffic flowing from the first network 52 into the second network 52 via a network device 1 flows into the first network 52 again via a network device 2, and further flows from the first network 52 into the second network 52 via the network device 2. As a method for solving such a problem, a conceivable method is to permit communication between the first network 52 and the second network 52 by only one network device of the plurality of network devices, and the network device that permits communication is changed in case of a failure in the network device.

Further, when the failure occurrence status of the first network 52 is not notified to the second network 52, the communication of traffic may not be resumed even in a redundant configuration using a plurality of network devices.

Consider a case where the first network 52 and the second network 52 are connected via the network devices 1 and 2. Now, it is assumed that the network device 1 is an active device that permits communication of traffic, and the network device 2 is a standby device that does not permit communication of traffic. Here, consider a case where all the interfaces connected to the first network 52 have failed in the network device 1. The traffic destined from the first network 52 to the second network 52 can continuously be communicated via the network device 2 based on the Ethernet ring protocol. On the other hand, the traffic destined from the second network 52 to the first network 52 is likely to be continuously transmitted to the network device 1 unless a message including information indicating that "it has become impossible to transfer a frame to the first network 52 even when transmitting it to the network device 1" is notified from interfaces of the network device 1 connected to the second network 52 to all the devices belonging to the second network 52.

Similarly, when all the interfaces connected to the second network 52 have failed in the network device 1, it is also necessary to notify the first network 52 of occurrence of the failure from an interface of the network device 1 connected to the first network 52.

The present invention has been made by focusing on the above circumstances, and an object thereof is to provide a network device, a network system, a network connection method, and a program that enable a first network that determines a traffic communication route using the Ethernet ring protocol and a second network that determines a traffic communication route by transmitting/receiving a control frame related to the traffic communication route within the network to be connected in a redundant configuration.

Means for Solving the Problem

In order to achieve the above object, a network device according to the present invention is configured to perform the following operations. When in an active state (a state in which traffic is communicated between networks), upon detection of a link disconnection in a first interface, it transmits a traffic communication impossibility control frame to the second network and transitions to a standby state (a state in which traffic is not communicated between networks), and upon detection of a link disconnection in a second interface, it transmits a traffic communication route change control frame to the first network and transitions to the standby state, and when in the standby state, upon reception of a traffic communication impossibility control frame or a traffic communication route change control frame from another network device, it transitions to the active state (depending on the priority of the device itself).

Specifically, a network device according to the present invention is a network device that connects, via interfaces, a first network that connects a plurality of network devices in a ring shape and determines a traffic communication route based on blockage of a route and learning of route information and a second network that determines a traffic communication route by network devices notifying each other whether communication of traffic is possible, the network device comprising:

a first network control unit that monitors first interfaces on the first network side of the interfaces;

a second network control unit that monitors second interfaces on the second network side of the interfaces; and a traffic communication possibility/impossibility determination unit that when in a state in which communication is permitted between the first network and the second network, transitions to a state in which communication is not permitted between the first network and the second network in response to having transitioned to a state in which all the first interfaces cannot communicate with the first network and at least one of the second interfaces can communication with the second network, and further causes the second network control unit to transmit information indicating that communication of traffic is impossible to the second network.

This network device can issue an EVPN control frame to the second network in response to disconnection of the ERP network, which is the first network, when active, and can stop traffic addressed to itself.

Further, a traffic communication possibility/impossibility determination unit of a network device according to the present invention, when in a state in which communication is permitted between the first network and the second network, can also transition to a state in which communication is not permitted between the first network and the second network in response to having transitioned to a state in which at least one of the first interfaces can communicate with the first network and all the second interfaces cannot communication with the second network, and further cause the first network control unit to transmit information instructing change of a traffic communication route to the first network.

This network device can issue an ERP control frame to the first network in response to disconnection of the EVPN network, which is the second network, when active, and can cause the traffic communication route to be changed.

Further, a traffic communication possibility/impossibility determination unit of a network device according to the present invention, when in a state in which communication is permitted between the first network and the second network, in response to presence of a user who has become unable to communicate traffic due to impossibility of communication of traffic via at least one of the second interfaces, can also cause the first network control unit to transmit information instructing change of a traffic communication route for the user to the first network.

This network device can stop traffic addressed to itself for a user of the EVPN network who has become unable to communicate traffic between the networks in response to the failure of the interface with the EVPN network, which is the second network, when active.

That is, a network system according to the present invention is a network system comprising: a first network that connects a plurality of network devices in a ring shape and determines a traffic communication route based on blockage of a route and learning of route information; a second network that determines a traffic communication route by network devices notifying each other whether communication of traffic is possible; and the plurality of network devices that connects the first network and the second network via interfaces, wherein the network device in a state in which communication is permitted between the first network and the second network can perform any of:

(1) transitioning to a state in which communication is not permitted between the first network and the second network in response to having transitioned to a state in which all first interfaces on the first network side of the interfaces cannot communicate with the first network and at least one of second interfaces on the second network side of the interfaces can communication with the second network, and further transmitting information indicating that communication of traffic is impossible to the second network;

(2) transitioning to a state in which communication is not permitted between the first network and the second network in response to having transitioned to a state in which at least one of the first interfaces can communicate with the first network and all the second interfaces cannot communication with the second network, and further transmitting information instructing change of a traffic communication route to the first network; and (3) in response to presence of a user who has become unable to communicate traffic due to impossibility of communication of traffic via at least one of the second interfaces, transmitting information instructing change of a traffic communication route for the user to the first network.

Then, a network connection method according to the present invention is an inter-network connection method for connecting a first network that connects a plurality of network devices in a ring shape and determines a traffic communication route based on blockage of a route and learning of route information and a second network that determines a traffic communication route by network devices notifying each other whether communication of traffic is possible via interfaces of the network devices, the inter-network connection method comprising causing the network device in a state in which communication is permitted between the first network and the second network to perform any of:

(1) transitioning to a state in which communication is not permitted between the first network and the second network in response to having transitioned to a state in which all first interfaces on the first network side of the interfaces cannot communicate with the first network and at least one of second interfaces on the second network side of the interfaces can communication with the second network, and further transmitting information indicating that communication of traffic is impossible to the second network;

(2) transitioning to a state in which communication is not permitted between the first network and the second network in response to having transitioned to a state in which at least one of the first interfaces can communicate with the first network and all the second interfaces cannot communication with the second network, and further transmitting information instructing change of a traffic communication route to the first network; and (3) in response to presence of a user who has become unable to communicate traffic due to impossibility of communication of traffic via at least one of the second interfaces, transmitting information instructing change of a traffic communication route for the user to the first network.

Further, the present invention is a program for causing a computer to function as the network device. The network device according to the present invention can also be implemented by a computer and a program, and the program can be recorded on a recording medium or provided through a network.

Note that the respective inventions described above can be combined as long as the combination is possible.

Effects of the Invention

The present invention can provide a network device, a network system, a network connection method, and a program that enable a first network that determines a traffic communication route using the Ethernet ring protocol and a second network that determines a traffic communication route by transmitting/receiving a control frame related to the traffic communication route within the network to be connected in a redundant configuration.

DESCRIPTION OF EMBODIMENTS

Hereinafter, network devices of embodiments according to the present invention will be described with reference to the drawings. Note that in the following embodiments, the same operation is performed in the parts given the same number, and the description thereof will be omitted.

First Embodiment

Figure 1:
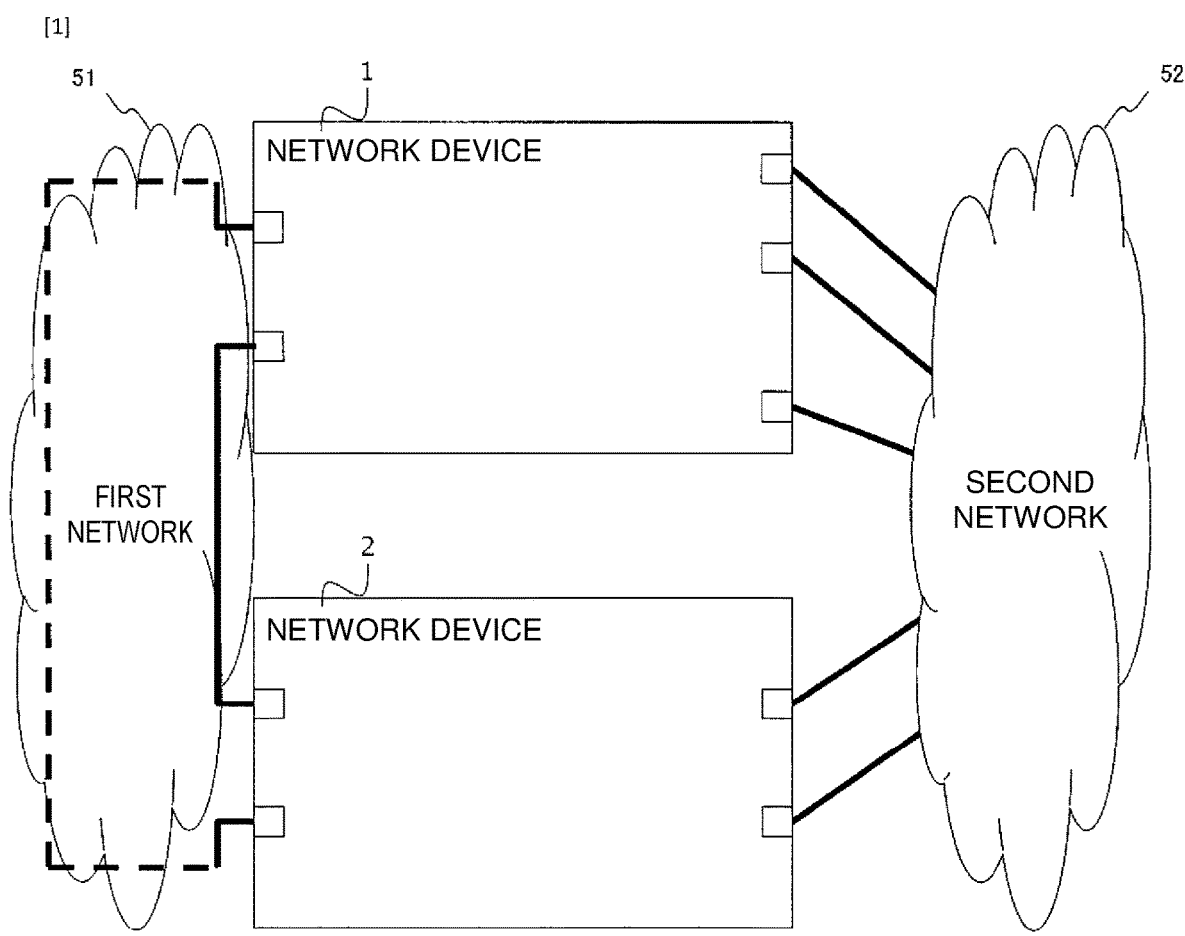
FIG. 1 is a diagram for explaining that a first network that connects network devices in a ring shape and a second network that determines a traffic communication route using a control frame are connected via a plurality of network devices.
Figure 2:
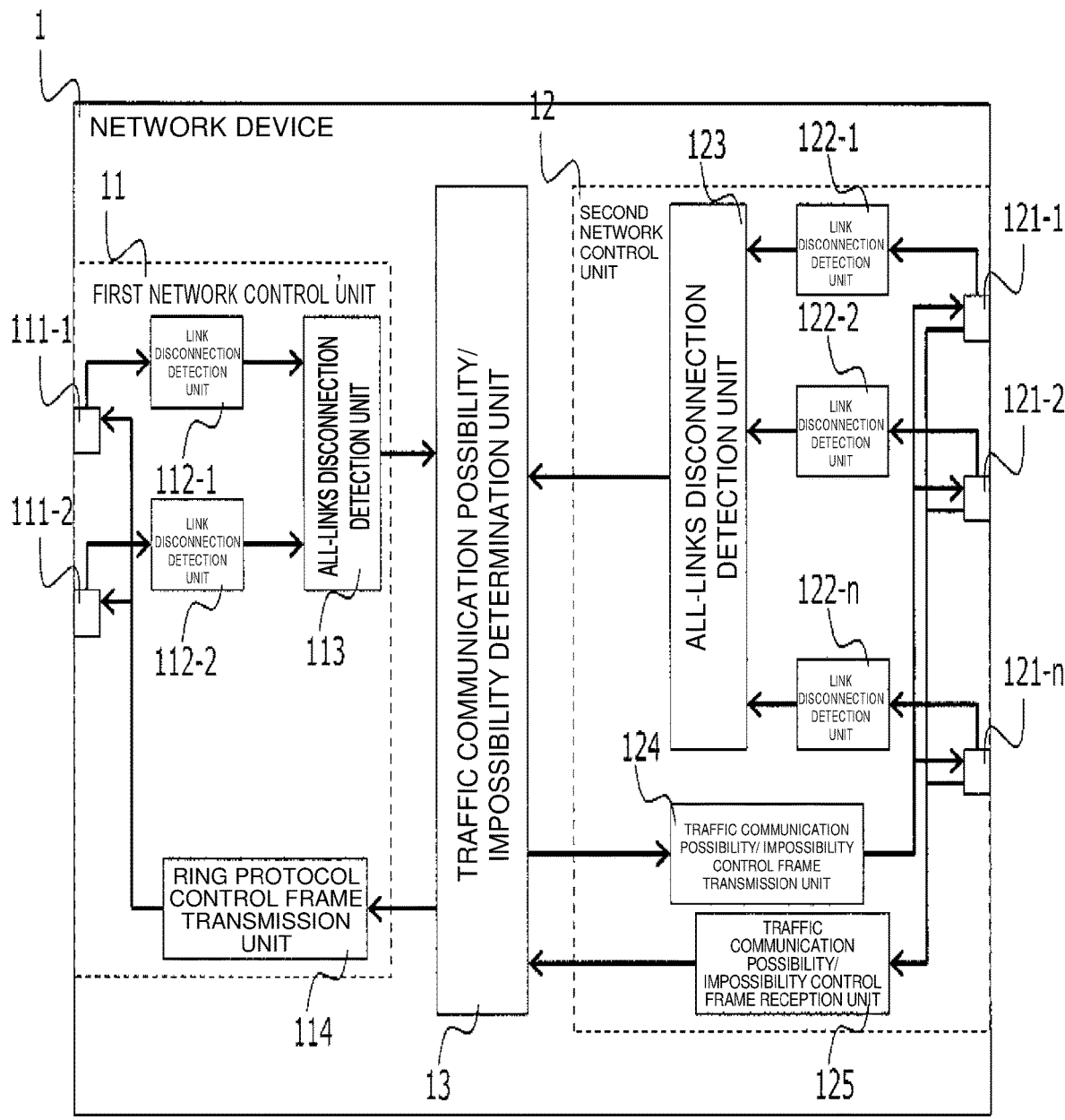
FIG. 2 is a diagram illustrating a configuration of a network device according to the present invention.

FIG. 2 shows a network device 1 that connects a first network and a second network of this embodiment. Note that in FIG. 2, the illustration of a route for transferring traffic itself is omitted.

The network device 1 that connects the first network and the second network comprises:

a first network control unit 11 that manages a traffic transfer route in the first network; a second network control unit 12 that manages a traffic transfer route in the second network; and a traffic communication possibility/impossibility determination unit 13 that determines whether communication of traffic is permitted between the first network and the second network.

The first network control unit 11 comprises interfaces (111-1, 111-2), link disconnection detection units (112-1, 112-2), an all-links disconnection detection unit 113, and a ring protocol control frame transmission unit 114. The interfaces (111-1, 111-2) are connected to the first network. The link disconnection detection units (112-1, 112-2) determine whether connection from the interfaces (111-1, 111-2) to the first network is possible. The all-links disconnection detection unit 113 determines whether all the interfaces connected to the first network are in the link-disconnected state based on information held by the link disconnection detection units. The ring protocol control frame transmission unit 114 transmits a traffic communication route change control frame for managing a traffic transfer route in the first network.

The second network control unit 12 comprises interfaces (121-1, 121-2, . . . , 121-$n$), link disconnection detection units (122-1, 122-2, . . . , 122-$n$), an all-links disconnection detection unit 123, a traffic communication possibility/impossibility control frame transmission unit 124, and a traffic communication possibility/impossibility control frame reception unit 125. The interfaces (121-1, 121-2, . . . , 121-$n$) are connected to the second network. The link disconnection detection units (122-1, 122-2, . . . , 122-$n$) determine whether connection from the interfaces (121-1, 121-2, . . . , 121-$n$) to the second network is possible. The all-links disconnection detection unit 123 determines whether all the interfaces connected to the second network are in the link-disconnected state based on information held by the link disconnection detection units. The traffic communication possibility/impossibility control frame transmission unit 124 transmits a traffic communication possibility/impossibility control frame for managing a traffic transfer route in the second network. The traffic communication possibility/impossibility control frame reception unit 125 receives a traffic communication possibility/impossibility control frame 32.

Here, the first network is a network in which network devices that perform frame transfer in Layer 2 are connected in a ring shape, and to which a protocol is applied for controlling communication of traffic by blocking the route between any given devices. For example, a ring network compliant with ITU-T G.8032 Ethernet ring protection switching corresponds to this. That is, as shown in FIG. 3, the first network is a network that avoids a loop by blocking an interface in any device connected in a ring shape, and that uses a traffic communication route change control frame for determining the blocked interface.

Further, the second network 52 is a network to which a protocol is applied that controls communication of traffic by each network device transmitting/receiving the traffic communication possibility/impossibility control frame 32 including information such as the network device's setting information, state, and connection states with networks other than the second network to/from another network device in the network. For example, a network compliant with RFC7432 BGP MPLS-based Ethernet VPN corresponds to this. That is, as shown in FIG. 3, the second network 52 is a network that determines a traffic communication route by exchanging the traffic communication possibility/impossibility control frame 32 including information on a network device between the network devices.

Figure 3:
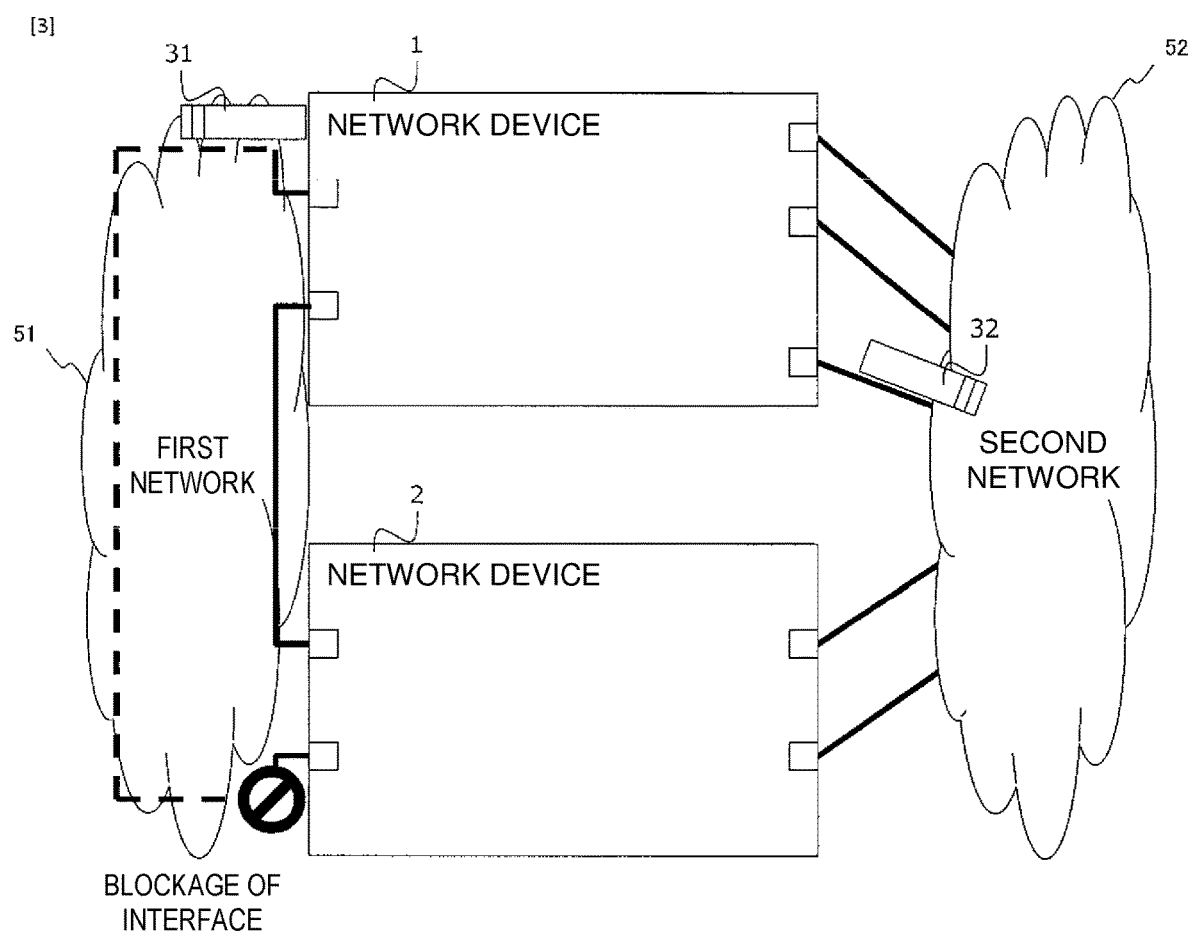
FIG. 3 is a diagram illustrating the operation of the network device according to the present invention.

As shown in FIG. 3, the plurality of network devices 1 and 2 connecting the first network 51 and the second network 52 secure the communicability between the first network and the second network even when one of the network devices has failed. On the other hand, when both the network device 1 and the network device 2 simultaneously allow communication of traffic between the first network and the second network, a loop failure occurs across the first network and the second network. Therefore, only one network device of the network devices 1 and 2 needs to allow communication of traffic between the first network and the second network. For example, in the second network 52 to which EVPN is applied, it is possible to determine "which network device permits communication between the second network and another network" by transmitting/receiving the traffic communication possibility/impossibility control frame 32.

In the first embodiment, this mechanism is utilized to notify another network device (e.g., the network device 2) of the result of determination by the traffic communication possibility/impossibility determination unit 13 of the network device 1 via the second network, thereby providing a device-redundant configuration while avoiding a loop failure.

FIG. 3 is a diagram illustrating the network device 1 of this embodiment. The network device 1 is a network device that connects, via interfaces, the first network 51 that connects a plurality of network devices in a ring shape and determines a traffic communication route based on blockage of a route and learning of route information and the second network 52 that determines a traffic communication route by network devices notifying each other whether communication of traffic is possible.

The network device 1 comprises:
the first network control unit 11;
the second network control unit 12; and
the traffic communication possibility/impossibility determination unit 13. The first network control unit 11 monitors first interfaces (111-1, 111-2) on the first network 51 side of the interfaces. The second network control unit 12 monitors second interfaces (121-1, 121-2, . . . , 121-n) on the second network 52 side of the interfaces. When in a state in which communication is permitted between the first network 51 and the second network 52, the traffic communication possibility/impossibility determination unit 13 transitions to a state in which communication is not permitted between the first network 51 and the second network 52, in response to having transitioned to a state in which all the first interfaces (111-1, 111-2) cannot communicate with the first network 51 and at least one of the second interfaces (121-1, 121-2, . . . , 121-n) can communicate with the second network 52. Further, the traffic communication possibility/impossibility determination unit 13 causes the second network control unit 12 to transmit information indicating that communication of traffic is impossible to the second network 52.

First, in the first network control unit 11, the link disconnection detection units (112-1, 112-2) monitor the link states of the two interfaces (111-1, 111-2) constituting the ring network. For example, it may be determined that it has transitioned to the link-disconnected state in response to an interface having become physically disconnected, or it may be determined whether it has transitioned to the link-disconnected state based on the transmission/reception state of a monitoring frame for continuous check to determine whether it is possible to communicate with another device directly connected to the interface.

In a network device that allows communication of traffic between the first network 51 and the second network 52 (hereinafter referred to as an active device), when only one interface of the two interfaces constituting the ring network has failed, it is possible to continue communication of traffic between the first network 51 and the second network 52 using the other interface provided in the active device based on the operation of the ring protocol without swapping the active device for the standby device.

On the other hand, in the active device, when all the interfaces connected to the first network 51 have transitioned to the link-disconnected state, it becomes impossible to communicate traffic between the first network 51 and another network using the network device. Therefore, the all-links disconnection detection unit 113 monitors the respective states of the link disconnection detection units (112-1, 112-2), and in response to both the link disconnection detection units (112-1, 112-2) having transitioned to the link-disconnected state, notifies the traffic communication possibility/impossibility determination unit 13 of information including "the fact that it has become impossible to communicate with the first network 51".

The traffic communication possibility/impossibility determination unit 13 changes the network device from the active device to the standby device in response to receiving the information including the fact that it has become impossible to communicate traffic to the first network 51.

In addition, the network device 1 transmits the traffic communication possibility/impossibility control frame 32 to the second network 52. The standby device connecting the first network 51 and the second network 52 that receives the traffic communication possibility/impossibility control frame 32 transitions to the active device, thereby make it possible to continue communication of traffic between the first network 51 and the second network 52.

Note that as for how to select a standby device to transition to the active device, for example, a control message used in EVPN may be used. That is, before it becomes impossible to communicate with the first network 51, information on devices that form a set in device-redundant configuration is exchanged, and priorities are determined in advance based on uniquely identifiable information (e.g., higher priority is given in ascending order of MAC addresses). In response to it having become impossible to communicate with the first network 51, the active device transmits the traffic communication possibility/impossibility control frame 32 to all the standby devices. Only the standby device that is given the highest priority in advance of the standby devices that receive the traffic communication possibility/impossibility control frame 32 transitions to the active device, and the other devices remain as standby devices, thereby making it possible to change the device that allows communication of traffic between the first network 51 and the second network 52.

The network device that transmits to the second network 52 the traffic communication possibility/impossibility control frame 32 including information indicating "that it has become impossible to communicate traffic due to the failure of all the interfaces connected to the first network 51" in response to the failure of all the interfaces connected to the first network 51 does so only when it is the device that permits communication of traffic between the first network 51 and the second network 52, that is, the active device. That is, even when all the interfaces connected to the first network 51 have transitioned to the link-disconnected state in the standby device that does not permit communication of traffic, the network device remains in the state of the standby device. Moreover, without the network device transmitting the traffic communication possibility/impossibility control frame 32 to the second network 52, it is possible to continue communication of traffic between the first network 51 and the second network 52 via another network device (i.e., the active device).

Note that as for traffic communication possibility/impossibility control frames other than the traffic communication possibility/impossibility control frame issued to the second network 52 in response to the failure of all the interfaces connected to the first network 51, information needs to be transmitted from all the devices regardless of whether they are an active device or a standby device. The traffic communication possibility/impossibility control frames for which information is to be transmitted are, for example, a traffic communication possibility/impossibility control frame used to reselect the device that allows communication of traffic between the first network 51 and the second network 52 due to a change in the configuration of the second network 52, and a traffic communication possibility/impossibility control frame used for periodical exchange of configuration information.

When in a state in which communication is permitted between the first network 51 and the second network 52, the traffic communication possibility/impossibility determination unit 13 transitions to a state in which communication is not permitted between the first network 51 and the second network 52 in response to having transitioned to a state in which at least one of the first interfaces (111-1, 111-2) can communicate with the first network 51 and all the second interfaces (121-1, 121-2, . . . , 121-n) cannot communicate with the second network 52. Further, the traffic communication possibility/impossibility determination unit 13 causes the first network control unit 11 to transmit information instructing change of a traffic communication route to the first network 51.

In the second network control unit 12, the link disconnection detection units (122-1, 122-2, . . . , 122-n) monitor the link states of the plurality of interfaces (121-1, 121-2, . . . , 121-n) connected to the second network 52. For example, it may be determined that it has transitioned to the link-disconnected state in response to an interface having become physically disconnected, or it may be determined whether it has transitioned to the link-disconnected state based on the transmission/reception state of a monitoring frame for continuous check to determine whether it is possible to communicate with another device directly connected to the interface. Note that the number of the interfaces connected to the second network 52 may be three or more, unlike the first network 51 (ring network).

Further, the traffic communication possibility/impossibility control frame transmission unit 124 transmits the state as to whether it is possible to communicate traffic to another network device, and the traffic communication possibility/impossibility control frame reception unit 125 further receives the state as to whether it is possible to communicate traffic from another network device. Thus, it is determined whether the network device is the active device that permits communication of traffic between the second network 52 and another network (which corresponds to the first network 51 in the first embodiment) or a standby device that does not permit communication of traffic.

In the first embodiment, when only some of the interfaces connected to the second device 52 have failed in the active device that allows communication of traffic between the second network 52 and the first network 51, the traffic communication possibility/impossibility control frame 32 is transmitted to the second network 52 so that traffic is communicated to other interfaces of the active device, thereby continuing communication of traffic between the first network 51 and the second network 52 without swapping the active device for the standby device.

On the other hand, when all the interfaces connected to the second network 52 have transitioned to the link-disconnected state, it becomes impossible to communicate traffic between the second network 52 and another network using the network device. Therefore, the all-links disconnection detection unit 123 monitors the respective states of the link disconnection detection units (122-1, 122-2, . . . , 122-n), and in response to all the link disconnection detection units (122-1, 122-2, . . . , 122-n) having transitioned to the link-disconnected state, notifies the traffic communication possibility/impossibility determination unit 13 of information including "the fact that it has become impossible to communicate with the second network 52".

The traffic communication possibility/impossibility determination unit 13 changes the network device 1 from the active device to the standby device in response to receiving the information including the fact that it has become impossible to communicate traffic to the second network 52.

In addition, the network device 1 transmits a traffic communication route change control frame 31 specified in the Ethernet ring protocol to the first network 51 to change the traffic communication route in the first network 51. Specifically, the traffic communication route change control frame 31 including information indicating discard of MAC address learning information is transmitted to all the network devices belonging to the first network 51. As a result, the learning information in all the network devices belonging to the first network 51, which has previously been learned to transfer traffic via the active device, is deleted, and route information will be learned again using frames transmitted/received after the learning information is deleted.

The standby device connecting the first network 51 and the second network 52 receives the traffic communication route change control frame 31 including the information indicating discard of the MAC address learning information to transition to the active device, thereby making it possible to continue communication of traffic between the first network 51 and the second network 52.

The network device that transmits to the first network 51 the traffic communication route change control frame 31 specified in the Ethernet ring protocol for changing the traffic communication route in response to the failure of all the interfaces connected to the second network 52 does so only when it is the device that permits communication of traffic between the first network 51 and the second network 52, that is, the active device. That is, even when all the interfaces connected to the second network 52 have transitioned to the link-disconnected state in the standby device that does not permit communication of traffic, the network device remains in the state of the standby device. Moreover, without the network device transmitting to the first network 51 the traffic communication route change control frame 31 specified in the Ethernet ring protocol for changing the traffic communication route, it is possible to continue communication of traffic between the first network 51 and the second network 52 via another network device (i.e., the active device).

Second Embodiment

Figure 4:
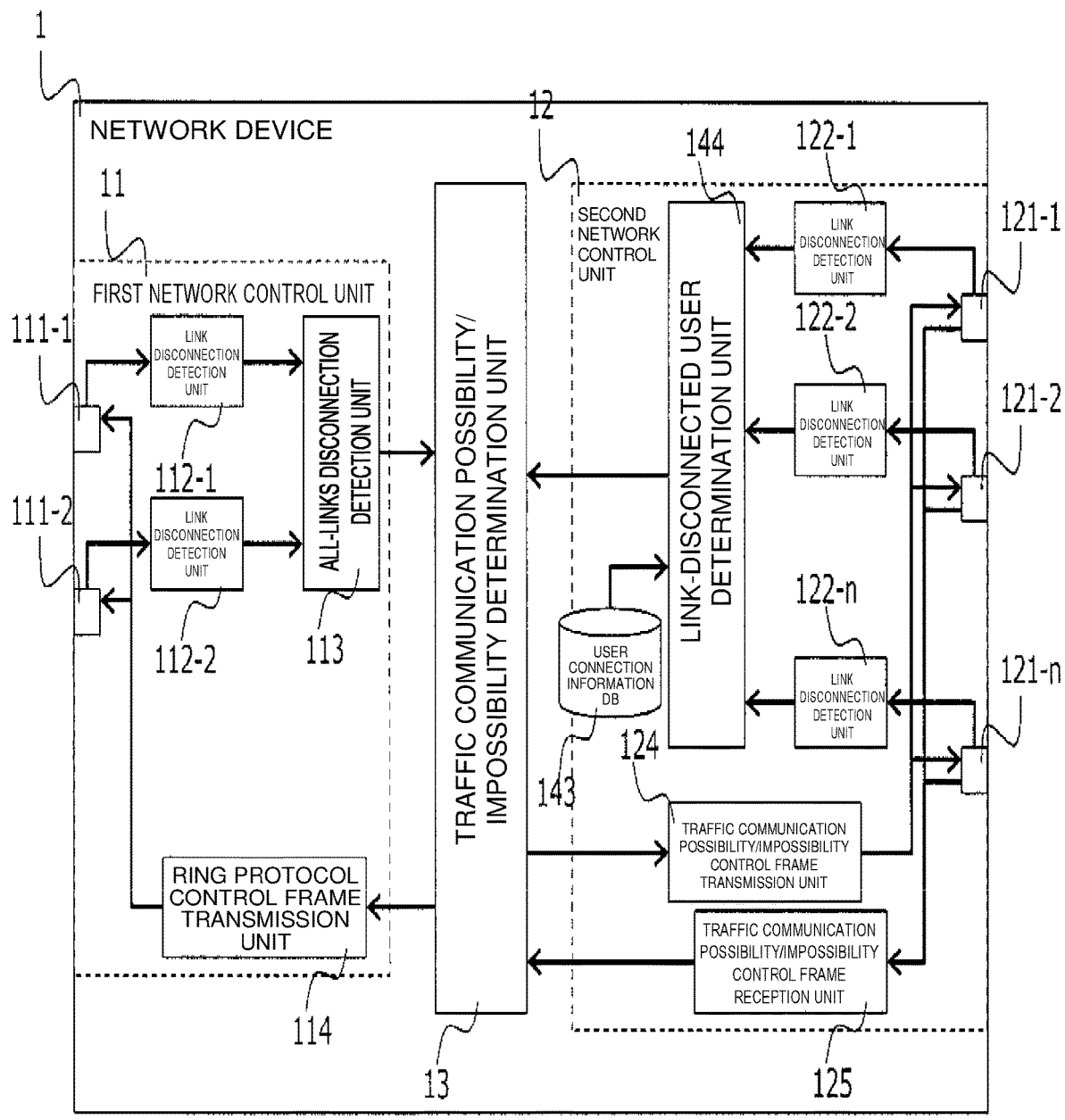
FIG. 4 is a diagram illustrating a configuration of a network device according to the present invention.

FIG. 4 shows a network device 1 that connects the first network 51 and the second network 52 of this embodiment. Note that in FIG. 4, the illustration of a route for transferring traffic itself is omitted.

The network device 1 of this embodiment is different from the network device 1 of the first embodiment in that the second network control unit 12 further comprises a user connection information DB (database) 143, and comprises a link-disconnected user determination unit 144 as a substitute for the all-links disconnection detection unit 123. The user connection information DB 143 holds a correspondence relationship between each interface connected to the second network 52 and an accommodated user. The link-disconnected user determination unit 144 determines a user who has become unable to communicate traffic to the second network 52 via the network device in response to link disconnection of the interface based on the correspondence relationship held in the user connection information DB 143.

When in a state in which communication is permitted between the first network 51 and the second network 52, in response to presence of a user who has become unable to communicate traffic due to impossibility of communication of traffic via at least one of the second interfaces (121-1, 121-2, . . . , 121-n), the traffic communication possibility/impossibility determination unit 13 causes the first network control unit 11 to transmit information 31 instructing change of a traffic communication route for the user to the first network 51.

In the network device 1 as well as the network system described in the first embodiment, when they have transitioned to a state in which all users cannot communicate with the second network 52, they make the switch to communication via another network device collectively for all users. The network device 1 as well as the network system described in the second embodiment are characterized by making the switch to communication via another network device for some users at a time point when it is determined that it has become difficult for the some users to perform communication via the network device rather than making the switch to communication via another network device collectively for all users.

That is, in the active device that allows communication of traffic between the first network 51 and the second network 52, when only one interface of the two interfaces (111-1, 111-2) constituting the ring network has failed, it is possible to continue communication of traffic between the first network 51 and the second network 52 using the other interface provided in the active device based on the operation of the ring protocol without swapping the active device for the standby device.

Thus, as the first network control unit 11, the first network control unit described in the first embodiment may be used as it is.

On the other hand, the second network 52 that determines the communication route by transmitting/receiving the traffic communication possibility/impossibility control frame 32 can transition to a state in which some users cannot communicate traffic even when all the interfaces (121-1, 121-2, . . . , 121-n) have not transitioned to the link-disconnected state.

Therefore, in the second embodiment, when only some of the interfaces connected to the second network 52 have failed in the active device that allows communication between the second network 52 and the first network 51, a user who has become unable to communicate traffic between the second network 52 and the first network 51 via the active device is changed to communicate traffic via another network device.

Specifically, in the second network control unit 14, the link disconnection detection units (122-1, 122-2, . . . , 122-n) monitor the link states of the plurality of interfaces (121-1, 121-2, . . . , 121-n) connected to the second network 52. For example, it may be determined that it has transitioned to the link-disconnected state in response to an interface having become physically disconnected, or it may be determined whether it has transitioned to the link-disconnected state based on the transmission/reception state of a monitoring frame for continuous check to determine whether it is possible to communicate with another device directly connected to the interface. Note that the number of the interfaces connected to the second network 52 may be three or more, unlike the first network 51 (ring network).

Further, the traffic communication possibility/impossibility control frame transmission unit 124 transmits the state as to whether it is possible to communicate traffic to another network device, and the traffic communication possibility/impossibility control frame reception unit 125 further receives the state as to whether it is possible to communicate traffic from another network device. Thus, it is determined whether the network device is the active device that permits communication of traffic between the second network 52 and another network (which corresponds to the second network 52 in the second embodiment) or a standby device that does not permit communication of traffic.

The user connection information DB 143 holds information such as whether the user accommodated in the second network 52 can use the interface 121-1, the interface 121-2, or the interface 121-n. Even when a link disconnection detection unit detects the failure of an interface, the user connection information DB enables determination of whether it is possible to continue communication of traffic with the first network 51 by using an alternative interface.

Based on information in the link disconnection detection units (122-1 to 122-n) and the user connection information DB, the link-disconnected user determination unit 144 determines a user who will become unable to communicate traffic between the first network 51 and the second network 52 if the network device is still the active device, and notifies the traffic communication possibility/impossibility determination unit 15 of information including "the fact that the user has become unable to communicate with the first network 51".

In response to receiving the information including the fact that the user has become unable to communicate traffic to the second network 52, the traffic communication possibility/impossibility determination unit 13 transmits the traffic communication route change control frame 31 specified in the Ethernet ring protocol to the first network 51 to change the traffic communication route in the first network 51. Specifically, the traffic communication route change control frame 31 including information indicating discard of the MAC address learning information associated with the user who has become unable to communicate with the second network 52 is transmitted to all the network devices belonging to the first network 51. As a result, in response to some interfaces that belong to the first network 51, which has previously been learned to transfer traffic via the active device, and that are connected to the second network 52 having transitioned to the link-disconnected state, the learning information on the user who has become unable to communicate traffic via the active device is deleted, and route information will be learned again using frames transmitted/received after the learning information is deleted. By learning the route information again, it is possible to continue communication of traffic from the first network 51 to the second network 52 via a newly selected active device.

Third Embodiment

Figure 5:
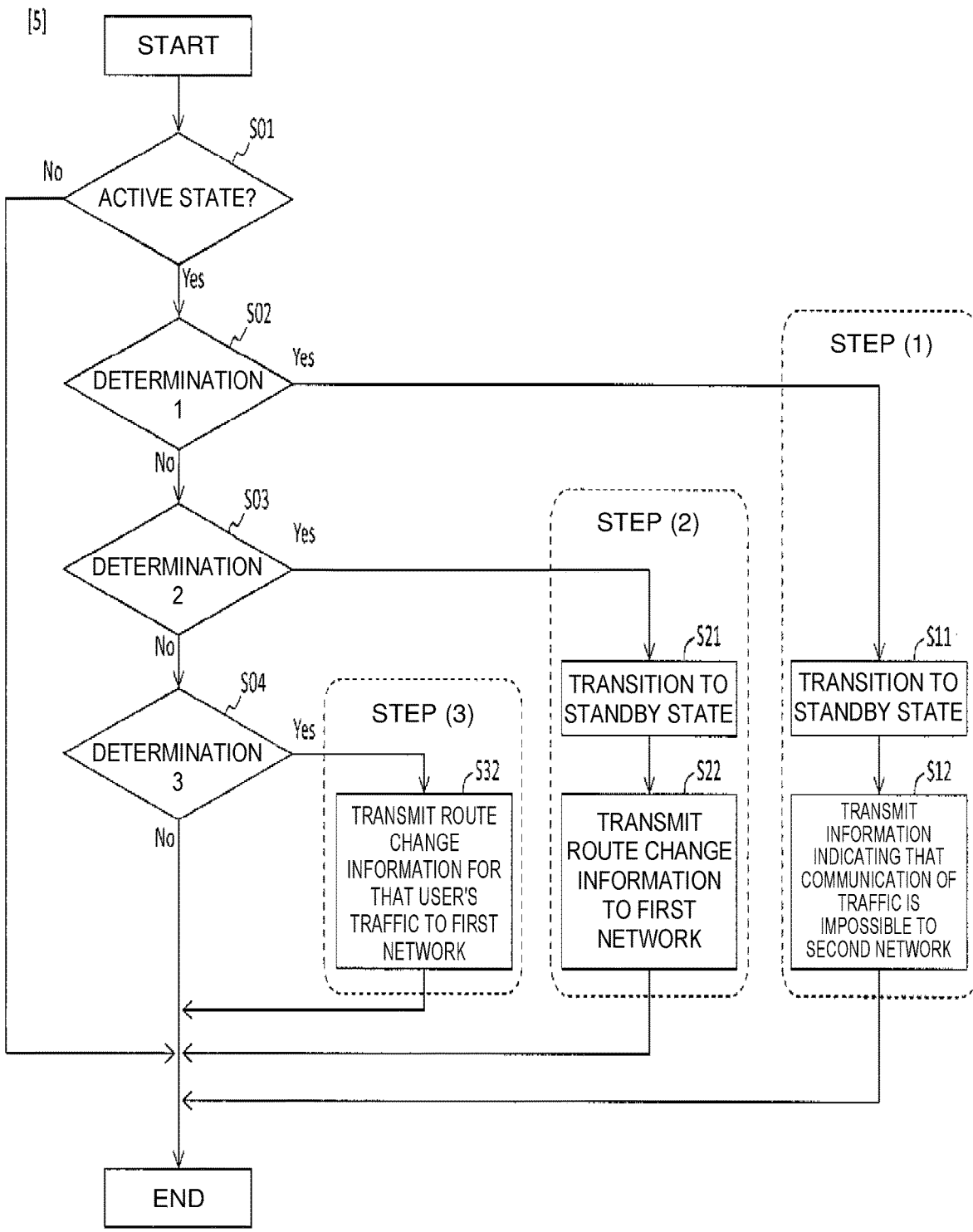
FIG. 5 is a diagram illustrating the operation of a network device according to the present invention.

FIG. 5 is a flowchart illustrating the operation of a network device of this embodiment. In the first and second embodiments, the redundant operation in the event of link disconnection in the connection between the networks has been described for each case. In this embodiment, it will be explained that one network device performs these redundant operations depending on the situation of link disconnection.

This network device determines whether it is in a state (active state) in which communication is permitted between the first network 51 and the second network 52 (step S01). When in the active state ("Yes" in step S01), this network device determines whether it has transitioned to a state in which all of the first interfaces (111-1, 111-2) cannot communicate with the first network 51 and at least one of the second interfaces (121-1, 121-2, . . . , 121-n) can communicate with the second network 52 ("DETERMINATION 1" in step S02). If "Yes" in "DETERMINATION 1", this network device transitions to a state (standby state) in which communication is not permitted between the first network 51 and the second network 52 (step S11), and further transmits information 32 indicating that communication of traffic is impossible to the second network 52 (step S12).

Further, if "No" in "DETERMINATION 1", this network device determines whether it has transitioned to a state in which at least one of the first interfaces (111-1, 111-2) can communicate with the first network 51 and all the second interfaces (121-1, 121-2, . . . , 121-n) cannot communicate with the second network 52 ("DETERMINATION 2" in step S03). If "Yes" in "DETERMINATION 2", this network device transitions to a state (standby state) in which communication is not permitted between the first network 51 and the second network 52 (step S21), and further transmits information 31 instructing change of a traffic communication route to the first network 51 (step S22).

Steps (S11, S12, S21, S22) are the operations described in the first embodiment.

Further, if "No" in "DETERMINATION 2", this network device determines whether a user is present who has become unable to communicate traffic due to impossibility of communication of traffic via at least one of the second interfaces (121-1, 121-2, . . . , 121-n) ("DETERMINATION 3" in step S04). If "Yes" in "DETERMINATION 3", this network device transmits information instructing change of a traffic communication route for the user to the first network 51 (step S32). Step S32 is the operation described in the second embodiment.

On the other hand, if "No" in step S01, this network device remains in the state (standby state) in which communication is not permitted between the first network 51 and the second network 52, and if "No" in all of "DETERMINATION 1" in step S02 to "DETERMINATION 3" in step S04, it remains in the active state.

INDUSTRIAL APPLICABILITY

The network device and network system according to the present invention can be applied to the information communication industry. Further, the network device according to the present invention can also be implemented by a computer and a program, and the program can be recorded on a recording medium or provided through a network.

REFERENCE SIGNS LIST

1, 2 Network device
11 First network control unit
12 Second network control unit
13 Traffic communication possibility/impossibility determination unit
31 Traffic communication route change control frame
32 Traffic communication possibility/impossibility control frame
51 First network
52 Second network
111-1, 111-2 Interface
112-1, 112-2 Link disconnection detection unit
113 All-links disconnection detection unit
114 Ring protocol control frame transmission unit
121-1, 121-2, . . . , 121-n Interface
122-1, 122-2, . . . , 122-n Link disconnection detection unit
123 All-links disconnection detection unit
124 Traffic communication possibility/impossibility control frame transmission unit
125 Traffic communication possibility/impossibility control frame reception unit
143 User connection information DB
144 Link-disconnected user determination unit

The invention claimed is:

1. A network device that connects, via interfaces, a first network that connects a plurality of network devices in a ring shape and determines a traffic communication route based on blockage of a route and learning of route information and a second network that determines a traffic communication route by network devices notifying each other whether communication of traffic is possible, the network device comprising:
a first network control unit that monitors first interfaces on the first network side of the interfaces;
a second network control unit that monitors second interfaces on the second network side of the interfaces; and
a traffic communication possibility/impossibility determination unit that when in a state in which communication is permitted between the first network and the second network, transitions to a state in which communication is not permitted between the first network and the second network in response to having transitioned to a state in which all the first interfaces cannot communicate with the first network and at least one of the second interfaces can communicate with the second network, and further causes the second network control unit to transmit information indicating that communication of traffic is impossible to the second network,
wherein the traffic communication possibility/impossibility determination unit further (a) issues an ethernet VPN (EVPN) control frame to the second network in response to disconnection of the first network and stops traffic to itself, and (b) issues an ethernet ring protocol (ERP) control frame to the first network in response to disconnection of the second network and causes a traffic communication route to be changed.

2. A non-transitory computer-readable medium having computer-executable instructions that, upon execution of the instructions by a processor of a computer, cause the computer to function as the network device according to claim 1.

3. A network system comprising: a first network that connects a plurality of network devices in a ring shape and determines a traffic communication route based on blockage of a route and learning of route information; a second network that determines a traffic communication route by network devices notifying each other whether communication of traffic is possible; and the plurality of network devices that connects the first network and the second network via interfaces, wherein the network device in a state in which communication is permitted between the first network and the second network performs:

(1) transitioning to a state in which communication is not permitted between the first network and the second network in response to having transitioned to a state in which all first interfaces on the first network side of the interfaces cannot communicate with the first network and at least one of second interfaces on the second network side of the interfaces can communicate with the second network, and further transmitting information indicating that communication of traffic is impossible to the second network;

(2) transitioning to a state in which communication is not permitted between the first network and the second network in response to having transitioned to a state in which at least one of the first interfaces can communicate with the first network and all the second interfaces cannot communicate with the second network, and further transmitting information instructing change of a traffic communication route to the first network;

(3) in response to presence of a user who has become unable to communicate traffic due to impossibility of communication of traffic via at least one of the second interfaces, transmitting information instructing change of a traffic communication route for the user to the first network;

(4) issues an ethernet VPN (EVPN) control frame to the second network in response to disconnection of the first network and stops traffic to itself; and (5) issues an ethernet ring protocol (ERP) control frame to the first network in response to disconnection of the second network and causes a traffic communication route to be changed.

4. An inter-network connection method for connecting a first network that connects a plurality of network devices in a ring shape and determines a traffic communication route based on blockage of a route and learning of route information and a second network that determines a traffic communication route by network devices notifying each other whether communication of traffic is possible via interfaces of the network devices, the inter-network connection method comprising causing the network device in a state in which communication is permitted between the first network and the second network to perform:

(1) transitioning to a state in which communication is not permitted between the first network and the second network in response to having transitioned to a state in which all first interfaces on the first network side of the interfaces cannot communicate with the first network and at least one of second interfaces on the second network side of the interfaces can communicate with the second network, and further transmitting information indicating that communication of traffic is impossible to the second network;

(2) transitioning to a state in which communication is not permitted between the first network and the second network in response to having transitioned to a state in which at least one of the first interfaces can communicate with the first network and all the second interfaces cannot communicate with the second network, and further transmitting information instructing change of a traffic communication route to the first network;

(3) in response to presence of a user who has become unable to communicate traffic due to impossibility of communication of traffic via at least one of the second interfaces, transmitting information instructing change of a traffic communication route for the user to the first network;

(4) issues an ethernet VPN (EVPN) control frame to the second network in response to disconnection of the first network and stops traffic to itself; and (5) issues an ethernet ring protocol (ERP) control frame to the first network in response to disconnection of the second network and causes a traffic communication route to be changed.

* * * * *